US011804369B2

(12) United States Patent
Takahashi

(10) Patent No.: US 11,804,369 B2
(45) Date of Patent: Oct. 31, 2023

(54) MASS SPECTROMETRY METHOD AND MASS SPECTROMETER

(71) Applicant: SHIMADZU CORPORATION, Kyoto (JP)

(72) Inventor: Hidenori Takahashi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 367 days.

(21) Appl. No.: 16/967,017

(22) PCT Filed: Nov. 21, 2018

(86) PCT No.: PCT/JP2018/043074
§ 371 (c)(1),
(2) Date: Nov. 3, 2020

(87) PCT Pub. No.: WO2019/155725
PCT Pub. Date: Aug. 15, 2019

(65) Prior Publication Data
US 2021/0050198 A1    Feb. 18, 2021

(30) Foreign Application Priority Data
Feb. 6, 2018    (JP) ................................ 2018-019344

(51) Int. Cl.
*H01J 49/04*    (2006.01)
*H01J 49/16*    (2006.01)
(Continued)

(52) U.S. Cl.
CPC ........ *H01J 49/0031* (2013.01); *G01N 27/623* (2021.01); *H01J 49/0045* (2013.01);
(Continued)

(58) Field of Classification Search
CPC ............... H01J 49/0031; H01J 49/0045; H01J 49/0495; H01J 49/005
See application file for complete search history.

(56) References Cited

U.S. PATENT DOCUMENTS

2008/0296486 A1    12/2008  Blanksby et al.
2009/0152458 A1*    6/2009  Vilkov ................ H01J 49/0045
                                                                250/288
(Continued)

FOREIGN PATENT DOCUMENTS

AU    2007211893 A1    12/2008
CA    2 951 762 A1    12/2015
(Continued)

OTHER PUBLICATIONS

Scott A. Mcluckey, "Principles of Collisional Activation in Analytical Mass Spectrometry", Journal American Society for Mass Spectrometry, 1992, pp. 599-614, vol. 3.
Bengt A. Anderson et al., "Pyrrolidides for Mass Spectrometric Determination of the Position of the Double Bond in Monounsaturated Fatty Acids", Lipids, 1974, pp. 187-190, vol. 9, No. 3.
(Continued)

*Primary Examiner* — David E Smith
(74) *Attorney, Agent, or Firm* — Sughrue Mion, PLLC

(57) ABSTRACT

A mass spectrometer 1, which is for generating a product ion from a precursor ion derived from a sample component having a hydrocarbon chain to analyze a mass, includes a reaction chamber 2 into which the precursor ion is introduced, radical generating units 51, 52, and 53 that generate a radical having an oxidizing ability or/and a radical other than a hydrogen radical having a reducing ability, a radical irradiation unit 54 that irradiates the inside of the reaction chamber 2 with the generated radical, a separation detection unit 3 that separates and detects the product ion generated from the precursor ion by a reaction with the radical according to a mass-to-charge ratio, and a structure estimation unit 14 that estimates the structure of the sample component (Continued)

based on the mass-to-charge ratio of the detected product ions and the information on the structure or the structure candidate.

13 Claims, 6 Drawing Sheets

(51) Int. Cl.
  H01J 49/40    (2006.01)
  H01J 49/00    (2006.01)
  H01J 49/24    (2006.01)
  G01N 27/623   (2021.01)

(52) U.S. Cl.
  CPC ........ *H01J 49/0495* (2013.01); *H01J 49/164* (2013.01); *H01J 49/24* (2013.01); *H01J 49/40* (2013.01)

(56) References Cited

U.S. PATENT DOCUMENTS

| | | | |
|---|---|---|---|
| 2010/0267148 A1 | 10/2010 | Blanksby et al. | |
| 2011/0127417 A1 | 6/2011 | Ibrahim et al. | |
| 2017/0047211 A1* | 2/2017 | Green | H01J 49/0059 |
| 2017/0117124 A1 | 4/2017 | Baba et al. | |
| 2018/0294148 A1 | 10/2018 | Ouyang et al. | |
| 2020/0111654 A1 | 4/2020 | Takahashi et al. | |

FOREIGN PATENT DOCUMENTS

| | | |
|---|---|---|
| JP | 2001-035692 A | 2/2001 |
| JP | 2017-519207 A | 7/2017 |
| JP | 2018-524567 A | 8/2018 |
| KR | 10-2014-0045112 A | 4/2014 |
| WO | 2015/189749 A1 | 12/2015 |
| WO | 2016/196312 A1 | 12/2016 |
| WO | 2018/186286 A1 | 10/2018 |

OTHER PUBLICATIONS

Shimma, Shuichi, et al. "Detailed structural analysis of lipids directly on tissue specimens using a MALDI-SpiralTOF-Reflectron TOF mass spectrometer." PloS one 7.5, May 2012, pp. 1-8, vol. 7, No. 5, e37107.

Robert E. Deimler et al., . "Radical-induced fragmentation of phospholipid cations using metastable atom-activated dissociation mass spectrometry (MAD-MS)." International Journal of Mass Spectrometry, 2015, pp. 178-186, vol. 390.

Yuji Shimabukuro et al., "Development of a Compact Atom Beam Source by Capacitively Coupled Plasma at 2.45GHz", Proc. of the 77th JSAP Academic Lecture, Japan Society of Applied Physics, Sep. 2016, 2 pgs.

Hidenori Takahashi et al., "Hydrogen Attachment/Abstraction Dissociation (HAD) of Gas-Phase Peptide Ions for Tandem Mass Spectrometry", Analytical Chemistry, Apr. 5, 2016, pp. 3810-3816, vol. 88, No. 7.

Theodora Nah et al., "OH-initiated oxidation of sub-micron unsaturated fatty acid particles", Physical Chemistry Chemical Physics, Sep. 24, 2013, pp. 18649-18663, vol. 15.

International Search Report for PCT/JP2018/043074 dated Jan. 15, 2019 (PCT/ISA/210).

Written Opinion of the International Searching Authority for PCT/JP2018/043074 dated Jan. 15, 2019 (PCT/ISA/23).

Xiaorong Liang et al. "Electron Transfer Dissociation of Doubly Sodiated Glycerophosphocholine Lipids", Journal of the American Society for Mass Spectrometry, 2007, vol. 18, No. 10, pp. 1783-1788 ( 6 pages total).

Communication dated Feb. 26, 2021, from the European Patent Office in application No. 18905481.0.

Decision to Grant a Patent dated Aug. 23, 2022 from the Japanese Patent Office in Japanese Application No. 2019-570307.

Second Office Action dated May 10, 2022 from the Japanese Patent Office in JP Application No. 2019-570307.

National TCM Industry Higher Education Thirteenth Five-Year Plan Textbook Analytical Chemistry, 2017, pp. 176-182 (16 pages).

Communication dated Jan. 28, 2023, issued in Chinese Application No. 201880088758.1.

* cited by examiner

MASS SPECTROMETRY METHOD AND MASS SPECTROMETER

TECHNICAL FIELD

The present invention relates to a mass spectrometry method and a mass spectrometer used for estimating a structure of a hydrocarbon chain by detecting product ions generated by dissociating an ion derived from a sample component having the hydrocarbon chain.

BACKGROUND ART

A mass spectrometry method is widely used in order to identify a polymer compound and analyze its structure, in which an ion having a specific mass-to-charge ratio is selected as a precursor ion from ions derived from a sample component, and product ions (also called fragment ions) are generated by dissociating the precursor ion one or more times, and the product ions are separated according to the mass-to-charge ratio, and detected. An ion trap time-of-flight mass spectrometer, for example, is used as a device for performing such a mass spectrometry method. As a method for dissociating a precursor ion with a large molecular weight trapped in the ion trap of an ion trap time-of-flight mass spectrometer, the LE-CID (Low-Energy Collision Induced Dissociation) method is most general in which a small amount of energy is added to the precursor repeatedly by vibrating the precursor ion in the ion trap to collide repeatedly with an inert gas such as argon so as to induce dissociation (for example, Non Patent Literature 1).

One of typical polymer compounds is fatty acid. Fatty acids are carboxylic acids having a hydrocarbon chain, and are roughly classified into saturated fatty acids and unsaturated fatty acids: saturated fatty acids have no unsaturated bond in the hydrocarbon chain, and unsaturated fatty acids have an unsaturated bond in the hydrocarbon chain. Fatty acids have different properties depending on the length of the hydrocarbon chain, and particularly in the case of unsaturated fatty acids, the biochemical activity changes depending on the position of the unsaturated bond included in the hydrocarbon chain. Therefore, in analyzing fatty acids or substances containing fatty acids (for example, phospholipids formed by binding known structures called head groups to fatty acids), the analysis is conducted effectively by generating and detecting product ions that are useful for estimating the structure of the hydrocarbon chain (i.e. position of unsaturated bond and length of hydrocarbon chain). However, in the energy storage type ion dissociation method such as the LE-CID method, since the energy imparted to the precursor ion is distributed throughout the molecule, the selectivity of the position at which the precursor ion dissociates is low, so that it is difficult to generate product ions useful for estimating the structure of the hydrocarbon chain of fatty acid etc.

Non Patent Literature 2 proposes a method for estimating the structure of a hydrocarbon chain of a fatty acid. This method uses the fact that when a fatty acid is derivatized with pyrrolidide and then electron-ionized, product ions dissociated at the position of the carbon-carbon bond, regardless of saturated bond or unsaturated bond, included in the hydrocarbon chain are generated. In this method, the difference between the mass of the product ion generated by dissociation at the position of a saturated bond and that generated by dissociation at the position of the carbon-carbon bond adjacent to the saturated bond position is 14 Da. The difference between the mass of the product ion generated by dissociation at the position of an unsaturated bond and that generated by dissociation at the position of the carbon-carbon bond adjacent to the unsaturated bond position is 12 Da. The structure of the hydrocarbon chain (length of the hydrocarbon chain and position of the unsaturated bond) is estimated based on these differences.

Patent Literature 1 proposes another method for estimating the structure of the hydrocarbon chain of the unsaturated fatty acid. This method uses the fact that a precursor ion derived from unsaturated fatty acid selectively dissociates at an unsaturated bond position when ozone is introduced into the ion trap and reacted with the unsaturated fatty acid. The structure of the hydrocarbon chain is estimated from the mass of the product ion generated by dissociation of the precursor ion at the position of the unsaturated bond.

Patent Literature 2 and Non Patent Literature 3 disclose a method for estimating the position of an unsaturated bond using the fact that, if the product ions are generated by irradiating recursor ions derived from unsaturated fatty acids with a high-energy electron beam to dissociate, or by using a high-energy collision induced dissociation (HE-CID) method in which the precursor ions are vibrated greater than the LE-CID method and collide with an inert gas, product ions dissociated at the position of the unsaturated bond are less likely to be generated, and the detected intensity becomes smaller than that of product ions in which the precursor ion is dissociated at the position other than the saturated bond.

Non Patent Literature 4 discloses a method for estimating the position of an unsaturated bond using the following fact. If a precursor ion derived from unsaturated fatty acid trapped in the ion trap is first irradiated with He accelerated at a high speed to change the precursor ion into a radical species and then collision-induced dissociation is performed to generate product ions, product ions in which the precursor ions are dissociated at the position of the unsaturated bond are less likely to be generated, and the detected intensity becomes smaller than that of the product ions generated by dissociating precursor ions at the position other than the unsaturated bond.

CITATION LIST

Patent Literature

Patent Literature 1: Australian Patent Application Publication No. 2007/211893
Patent Literature 2: Canadian Patent Application Publication No. 2951762

Non Patent Literature

Non Patent Literature 1: McLuckey, Scott A. "Principles of collisional activation in analytical mass spectrometry." Journal of the American Society for Mass Spectrometry 3.6 (1992): 599-614.
Non Patent Literature 2: Andersson, Bengt A., and Ralph T. Holman. "Pyrrolidides for mass spectrometric determination of the position of the double bond in monounsaturated fatty acids." Lipids 9.3 (1974): 185-190.
Non Patent Literature 3: Shimma, Shuichi, et al. "Detailed structural analysis of lipids directly on tissue specimens using a MALDI-SpiralTOF-Reflectron TOF mass spectrometer." PloS one 7.5 (2012): e37107.
Non Patent Literature 4: Deimler, Robert E., Madlen Sander, and Glen P. Jackson. "Radical-induced fragmentation of phospholipid cations using metastable atom-activated dissociation mass spectrometry (MAD-MS)." International journal of mass spectrometry 390 (2015): 178-186.

Non Patent Literature 5: Shimabukuro, Kasuya, Wada, "Development of a Compact Atom Beam Source by Capacitively Coupled Plasma at 2.45 GHz", Proc. of the 77th JSAP Academic Lecture, September 2016, Japan Society of Applied Physics

SUMMARY OF INVENTION

Technical Problem

In the method described in Non Patent Literature 2, it is necessary to derivatize the unsaturated fatty acid in advance, and the pretreatment is laborious. Also, some unsaturated fatty acids cannot be derivatized at all.

The method described in Patent Literature 1 uses highly reactive ozone. This makes it necessary to introduce equipment such as an ozone filter for preventing ozone from being released into the atmosphere. Further, if ozone enters the inside of the mass spectrometer, the electrodes and insulators of various parts may be oxidized and the performance of the mass spectrometer may deteriorate.

In the methods described in Patent Literature 2, Non Patent Literature 3, and Non Patent Literature 4, the position of the unsaturated bond is estimated using the fact that the detection intensity of product ions generated by dissociating precursor ions at the position of unsaturated bond is smaller than that of product ions generated by dissociating precursor ions at the position other than unsaturated bond. It should be noted that the intensity of the mass peaks of product ions dissociated at the position other than unsaturated bond may also be small depending on the type of unsaturated fatty acid and the measurement conditions. Thus, it is difficult with those methods to estimate the position of the unsaturated bond with high accuracy.

So far the estimation methods of the structure of unsaturated fatty acid has been mainly discussed. Among those methods, the methods described in Patent Literature 2 and Non Patent Literatures 2 to 4 can also be used for estimating the structure of saturated fatty acid. However, the method described in Non Patent Literature 2 has a problem that the pretreatment is laborious as described above, and it is not possible to analyze sample components that cannot be derivatized. Further, in the methods described in Patent Literature 2, Non Patent Literature 3, and Non Patent Literature 4, a mass peak with low intensity may be mistakenly recognized as that corresponding to product ions generated by dissociation at the position of unsaturated bond, and may be mistakenly estimated from an unsaturated fatty acid even though it is actually from a saturated fatty acid.

An object of the invention is to provide a mass spectrometric technique capable of estimating the structure of a hydrocarbon chain of a sample component having the hydrocarbon chain with simplicity and high accuracy.

Solution to Problem

The invention has been made to solve the above problems, and provides a mass spectrometry method for producing a product ion from a precursor ion derived from a sample component having a hydrocarbon chain and mass-analyzing the product ion. The method includes irradiating the precursor ion with a radical having an oxidizing ability other than hydrogen radical or/and with a radical having a reducing ability to produce product ions, separating the product ions according to a mass-to-charge ratio, detecting the product ion, and estimating a structure of the hydrocarbon chain based on the mass-to-charge ratio and the intensity of the detected product ion.

The term "hydrocarbon" may refer to a compound consisting only of carbon atoms and hydrogen atoms, but "hydrocarbon chain" described in the present specification is not necessarily limited to those consisting only of carbon atoms and hydrogen atoms. For example, a side chain may be modified by a component containing atoms other than carbon atoms and hydrogen atoms, such as a hydroxyl group or a carboxyl group. The structure of the hydrocarbon chain may include a straight chain, a branched chain, and a cyclic chain. In addition, the carbon-carbon bond of the hydrocarbon chain may include both saturated and unsaturated bonds. In addition, the length of the hydrocarbon chain whose structure is to be estimated in the invention is not particularly limited as long as it is a length that allows mass spectrometry, and for example, the structure of a sample component having a hydrocarbon chain containing 200 or 300 carbon atoms can be estimated.

One example of the sample component having a hydrocarbon chain is a sample component formed by binding a substance having a known structure or structure candidate to the hydrocarbon chain, such as fatty acid which is a carboxylic acid having the hydrocarbon chain, or a phospholipid obtained by binding one of dozens of structure candidates to the fatty acid. When the sample component having a hydrocarbon chain is one in which a substance having a known structure or structure candidate is bound to the hydrocarbon chain, the entire structure of the sample component can be estimated by using the mass spectrometry method of the invention. The sample component having the above-mentioned hydrocarbon chain is not necessarily limited to one having a known structure or structure candidate other than the hydrocarbon chain. The above-mentioned problems are related to the estimation of the structure of the hydrocarbon chain, and it is possible to estimate at least the structure of the hydrocarbon chain of the entire structure even for sample components whose structure other than the hydrocarbon chain is unknown. In addition, the structure of the portion other than the hydrocarbon chain of the sample component may be estimated from the structural analysis of the product ion generated by dissociating the precursor ion by the LE-CID method. Therefore, the structure of the entire sample component can be estimated in combination with the estimation.

In the mass spectrometry method according to the invention, a precursor ion derived from the sample component having the hydrocarbon chain is irradiated with a radical having an oxidizing ability other than hydrogen radicals, or/and a radical having a reducing ability to generate a product ion, which is detected. According to the measurement performed by the inventor, when the precursor ion derived from the sample component having the hydrocarbon chain is irradiated with a hydroxyl radical or/and an oxygen radical, which is a typical radical having an oxidizing ability, the precursor ion is selectively dissociated at the position of the unsaturated bond included in the hydrocarbon chain, and the product ion having an oxygen atom added at that position is generated. Therefore, the structure of at least the hydrocarbon chain included in the sample component can be estimated based on the mass-to-charge ratio of the product ions detected with an intensity that is significantly distinguishable from noise.

Further, when the precursor ion derived from the sample component having the hydrocarbon chain is irradiated with a radical having an oxidizing ability, the product ion (the ion in which the oxygen atom is added to the precursor ion; hereinafter, referred to as "precursor adduct ion") added with an oxygen atom at the position of the unsaturated bond included in the hydrocarbon chain is also generated. From the measurement performed by the inventor, it has been found that the generation efficiency of the precursor adduct ion is higher when the precursor ion is of a trans type than when it is of a cis type. Therefore, it is possible to estimate whether the hydrocarbon chain included in the sample component is a cis type or trans type based on the intensity of the precursor adduct ions.

The hydrogen radical is a kind of radical having an oxidizing ability in a sense that it abstracts a hydrogen atom from the hydrocarbon chain. However, the hydrogen radical has a low selectivity of the dissociation position of the precursor ion. Further, when hydrogen radicals are used, not only the dissociation of the precursor ions by the abstraction of hydrogen atoms from the hydrocarbon chain, but also the reaction that other hydrogen radicals are attached to the hydrocarbon chain after the hydrogen atoms are abstracted occur almost at the same time. Therefore, other hydrogen radicals are attached to the product ions generated by the abstraction of hydrogen atoms of the hydrocarbon chain due to the hydrogen radicals, so that product ions having various mass-to-charge ratios are generated, and it becomes difficult to analyze the product ion spectrum. Therefore, in the mass spectrometry method according to the invention, hydrogen radicals are excluded. The exclusion of hydrogen radicals in the invention is to exclude irradiating precursor ions only with the hydrogen radicals: irradiating the precursor ions with hydrogen radicals that are simultaneously generated when other radicals are generated is not excluded in the invention.

Further, according to another measurement performed by the inventor, when the precursor ion derived from the sample component having the hydrocarbon chain is irradiated with a nitrogen radical which is a typical radical having a reducing ability, the precursor ion is dissociated at the position of the carbon-carbon bond included in the hydrocarbon chain regardless of the saturated bond or unsaturated bond so as to generate the product ion. The difference between the mass of the product ion generated by dissociation at the position of a saturated bond and that of the product ion generated by dissociation at the position of a carbon-carbon bond adjacent to the saturated bond is 14 Da. On the other hand, the difference between the mass of the product ion generated by dissociation at the position of an unsaturated bond and that of the product ion generated by dissociation at the position of a carbon-carbon bond adjacent to the unsaturated bond is 12 Da. Therefore, by utilizing this difference, the structure of at least the hydrocarbon chain included in the sample component can be estimated based on the mass-to-charge ratio of the product ions and the information (mass etc.) on a known structure or structure candidate of the substance.

The mass spectrometry method according to the invention does not require pretreatment such as derivatization and does not use highly reactive ozone, so that various sample components can be easily analyzed. Further, the mass spectrometry method according to the invention estimates the structure based not on the fact that the detection intensity of product ions specifically decreases, but on the mass-to-charge ratio of the product ions which can be detected with sufficient intensity. Therefore, the structure of the hydrocarbon chain included in the sample component can be estimated with high accuracy.

Another aspect of the invention to solve the above-mentioned problems is a mass spectrometer for producing a product ion from a precursor ion derived from a sample component having a hydrocarbon chain and mass-analyzing the product ion. The mass spectrometer includes a reaction chamber into which the precursor ion is introduced, a radical generating unit that produces a radical having an oxidizing ability other than a hydrogen radical or/and a radical having a reducing ability, a radical irradiation unit that irradiates an inside of the reaction chamber with the radical produced by the radical generating unit, and a separation detection unit that separates and detects the product ion generated from the precursor ion by a reaction with the radical according to a mass-to-charge ratio.

Further, the mass spectrometer according to the invention may include a structure estimation unit that estimates a structure of the hydrocarbon chain based on a mass-to-charge ratio and an intensity of the detected product ion.

When the radical with which the reaction chamber is irradiated is a radical having an oxidizing ability, the structure estimation unit can estimate the position of the unsaturated bond from the mass-to-charge ratio of the product ion generated by dissociating the precursor ion at the position of the unsaturated bond of the hydrocarbon chain. Alternatively, the structure estimation unit can estimate whether the unsaturated bond is a cis type or trans type based on the intensity of the precursor adduct ion in which an oxygen atom is added to the precursor ion.

In addition, when the radical irradiated to the reaction chamber is a radical having a reducing ability, the structure estimation unit can estimate the structure of the hydrocarbon chain from the mass-to-charge ratio of the product ion generated by cleavage of the carbon-carbon bond of hydrocarbon.

As the radical generating unit, either one generating a radical in an atmospheric pressure atmosphere or one generating a radical in vacuum may be used. As a device that generates radicals in an atmospheric pressure atmosphere, for example, a radical generating unit that uses corona discharge may be used. Further, the radical generating unit that generates radicals in vacuum may include, for example, a radical generation chamber, a vacuum exhaust unit for exhausting the radical generation chamber, a raw gas supply source for introducing a raw gas into the radical generating chamber, and a vacuum discharge unit for generating a vacuum electrical discharge in the radical generation chamber.

A mass separation unit for selecting the precursor ions by a mass spectrometer and a mass separation unit for mass-separating the product ions generated by dissociation of precursor ions are arranged in a high vacuum space. Therefore, when radicals are generated in the atmospheric pressure space, vacuum pumps must be arranged in front of and behind the radical generating unit, which makes the device large and expensive. Further, the radicals generated in the atmospheric pressure atmosphere are likely to collide with the surrounding gas and radicals and to be lost by recombination, and the utilization efficiency of radicals is low. These problems can be avoided by using a radical generating unit that generates radicals in vacuum.

For the vacuum discharge unit, for example, a radio-frequency plasma source, a hollow cathode plasma source, or a magnetic field confinement type plasma source can be used. When the radio-frequency plasma source is used, the temperature of radicals generated is higher and the reactivity is higher when the capacitively coupled radio-frequency plasma source is used than when the inductively coupled radio-frequency plasma source is used. Therefore, it is considered that by using a capacitively coupled radio-frequency plasma source, product ions can be generated with high efficiency and detection intensity can be increased.

Further, the mass spectrometer according to the invention preferably includes a heat applying unit for applying heat to a precursor ion introduced into the reaction chamber. By applying heat to the precursor ions, it is possible to increase the internal energy of the precursor ions to enhance the reactivity with radicals and to generate the product ions with high efficiency.

Further, the mass spectrometer according to the invention preferably includes a heating unit for heating the raw gas, which is provided in at least one of the raw gas supply source, the reaction chamber, and a flow path from the raw gas supply source to the reaction chamber. In this aspect, by heating the raw gas, the temperature of the generated radicals can be raised to increase the reactivity and the product ions can be generated with high efficiency.

Advantageous Effects of Invention

By using a mass spectrometry method or a mass spectrometer according to the invention, the structure of the hydrocarbon chain of a sample component having a hydrocarbon chain can be estimated with simplicity and high accuracy.

DESCRIPTION OF EMBODIMENTS

An embodiment of an ion analyzer according to the invention will be described below with reference to the drawings. The ion analyzer of this embodiment is an ion trap-time-of-flight (IT-TOF type) mass spectrometer.

Figure 1:
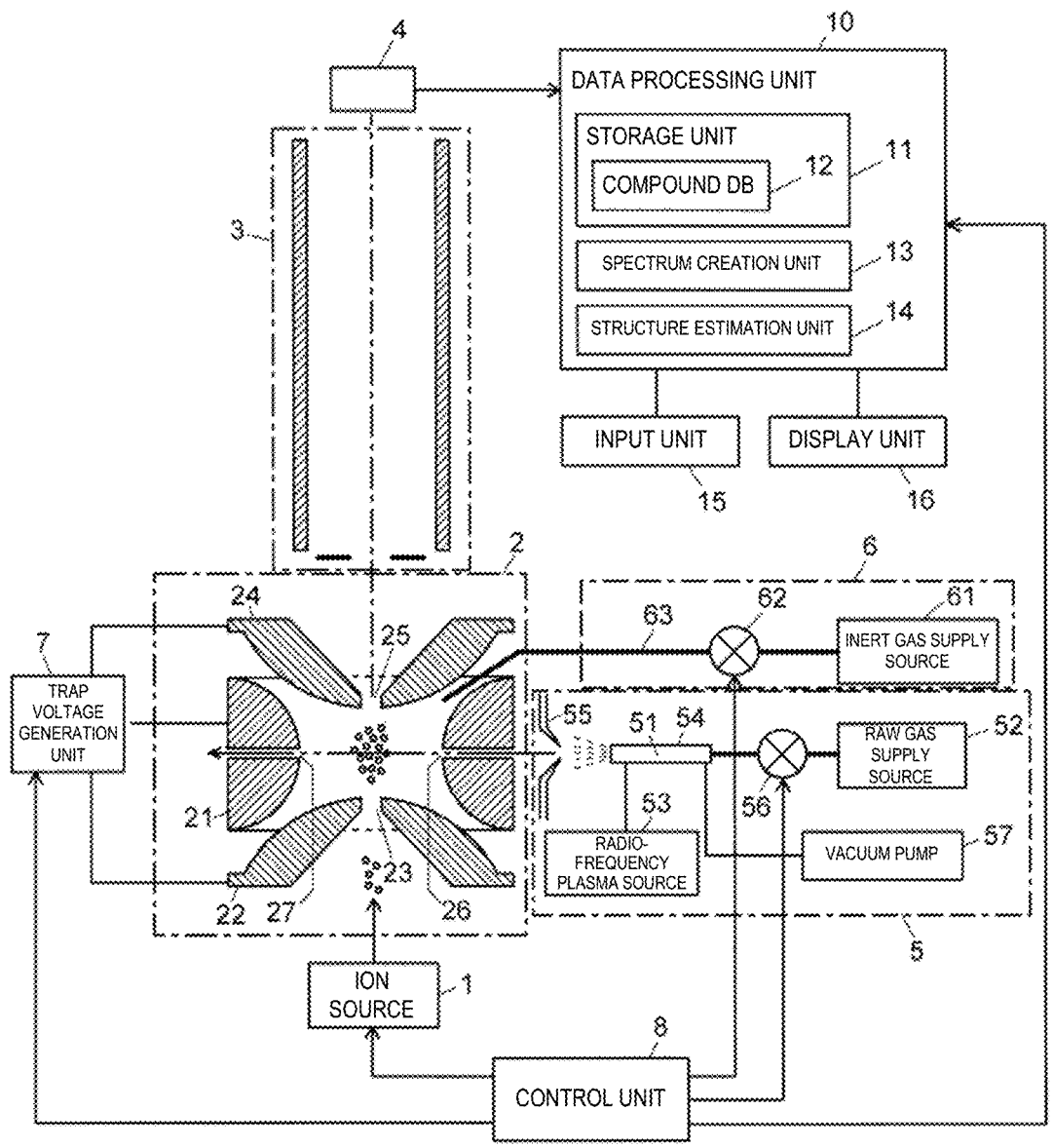
FIG. 1 is a schematic configuration diagram of an ion trap-time-of-flight mass spectrometer that is an embodiment of a mass spectrometer according to the invention.

FIG. 1 illustrates a schematic configuration of an ion trap-time-of-flight mass spectrometer (hereinafter, also simply referred to as "mass spectrometer") of this embodiment. The mass spectrometer of this embodiment, inside a vacuum chamber (not illustrated) maintained in vacuum, includes an ion source 1 for ionizing components in a sample, an ion trap 2 for trapping ions generated by the ion source 1 by the action of a radio-frequency electric field, a time-of-flight mass separation unit 3 for separating ions ejected from the ion trap 2 according to a mass-to-charge ratio, and an ion detector 4 for detecting the separated ions. The mass spectrometer of this embodiment further includes a radical generation/irradiation unit 5 for irradiating the precursor ions trapped in the ion trap 2 with radicals in order to dissociate the ions trapped in the ion trap 2, an inert gas supply unit 6 for supplying a predetermined type of inert gas into the ion trap 2, a trap voltage generation unit 7, a control unit 8, and a data processing unit 10.

The substance of the data processing unit 10 is a general personal computer, and a storage unit 11 of the data processing unit stores a compound database 12. In addition, a spectrum creation unit 13 and a structure estimation unit 14 are provided as functional blocks. The spectrum creation unit 13 and the structure estimation unit 14 are embodied by executing a predetermined program installed in the personal computer in advance. Further, the data processing unit 10 is connected to an input unit 15 and a display unit 16. For example, when the mass spectrometer of this embodiment is used to analyze phospholipids, the compound database 12 is used which is recorded with information on several tens of types of structures (characteristics of phospholipids) called head groups (information associated with names, structures, and masses of head groups), and information on a ratio of the intensity of the precursor adduct ion (an ion in which oxygen atom is added to the precursor ion) to the intensity of the precursor ion generated from the phospholipid having a hydrocarbon chain including at least one unsaturated bond. The information recorded in the compound database 12 may be based on the data acquired by actually measuring a standard sample or the like, or may be based on the data acquired from simulation by computational science.

The ion source 1 of the mass spectrometer of this embodiment is a MALDI ion source. In the MALDI ion source, a substance (matrix substance) that easily absorbs laser light and is easy to ionize is applied to the surface of the sample to microcrystallize the matrix substance incorporating the sample molecules, so the sample substance is ionized by irradiating the matrix substance with the laser light. The ion trap 2 is a three-dimensional ion trap which includes an annular ring electrode 21, and a pair of end cap electrodes (an inlet-side end cap electrode 22 and an outlet-side end cap electrode 24) that are opposed to each other with the ring electrode 21 interposed therebetween. A radical introduction port 26 and a radical discharge port 27 are formed in the ring electrode 21. An ion introduction hole 23 is formed in the inlet-side end cap electrode 22. An ion ejection hole 25 is formed in the outlet-side end cap electrode 24. In response to an instruction from the control unit 8, the trap voltage generation unit 7 applies any one of a radio-frequency voltage and a DC voltage, or a voltage obtained by combining them to the electrodes 21, 22, and 24 at a predetermined timing.

The radical generation/irradiation unit 5 includes a nozzle 54 having a radical generation chamber 51 formed inside, a raw gas supply source (raw gas supply unit) 52 for introducing a raw gas into the radical generation chamber 51, a vacuum pump (vacuum exhaust unit) 57 for exhausting the radical generation chamber 51, an inductively coupled radio-frequency plasma source 53 for supplying a microwave for generating a vacuum electrical discharge in the radical generation chamber 51, a skimmer 55 that has an opening on a central axis of the jet flow from the nozzle 54 and that separates the diffused raw gas molecules and the like to abstract a small-diameter radical flow, and a valve 56 provided in the flow path from the raw gas supply source 52 to the radical generation chamber 51. As the raw gas, for example, water vapor (water), nitrogen gas, air or the like can be used. When water vapor is used as the raw gas, hydroxyl radicals, oxygen radicals, and hydrogen radicals are generated. When nitrogen gas is used, nitrogen radicals are generated. When air is used, oxygen radicals and nitrogen radicals are mainly generated.

Figure 2:
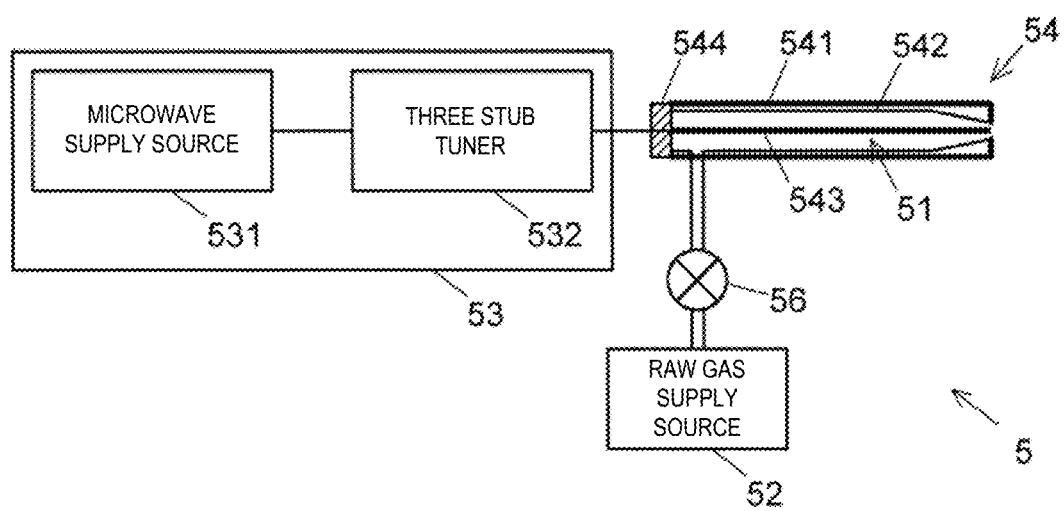
FIG. 2 is a schematic configuration diagram of a radical irradiation unit used in the ion trap time-of-flight mass spectrometer of this embodiment.

As the radical generation/irradiation unit 5, for example, the configuration described in Non Patent Literature 5 can be used. The schematic configuration of the radical generation/irradiation unit is illustrated in FIG. 2. The radical generation/irradiation unit 5 is roughly configured by the radio-frequency plasma source 53, the nozzle 54, and the raw gas supply source 52. The radio-frequency plasma source 53 includes a microwave supply source 531 and a three stub tuner 532. The nozzle 54 includes a ground electrode 541 that forms the outer peripheral portion of the nozzle 54, and a torch 542 made of Pyrex (registered trademark) glass located inside the ground electrode 541. The inside of the torch 542 forms the radical generation chamber 51. Inside the radical generation chamber 51, a needle electrode 543 connected to the radio-frequency plasma source 53 via a connector 544 penetrates in the longitudinal direction of the radical generation chamber 51. Further, a flow path for supplying the raw gas from the raw gas supply source 52 to the radical generation chamber 51 is provided, and the valve 56 for adjusting the flow rate of the raw gas is provided on the flow path.

The inert gas supply unit 6 includes a gas supply source 61 which stores an inert gas such as helium or argon used as a buffer gas or a cooling gas, a valve 62 for adjusting the flow rate of the gas, and a gas introduction pipe 63.

Next, the analysis operation using the mass spectrometer of this embodiment will be described. Before starting analysis, the inside of the vacuum chamber and the radical generation chamber 51 is evacuated to a predetermined pressure by a vacuum pump. Then, the valve 56 opens to supply the raw gas from the raw gas supply source 52 to the radical generation chamber 51 of the radical generation/irradiation unit 5, the microwave is supplied from the microwave supply source 531, and radicals are generated inside the radical generation chamber 51.

Various ions generated from components in the sample in the ion source 1 (mainly monovalent ions) are ejected from the ion source 1 in the form of a packet, and the ions pass through the ion introduction holes 23 formed in the inlet-side end cap electrode 22 and introduced inside of the ion trap 2. Ions derived from the sample components introduced into the ion trap 2 are trapped by a radio-frequency electric field formed in the ion trap 2 by a radio-frequency voltage applied in the ring electrode 21 from the trap voltage generation unit 7 (or a voltage obtained by combining a radio-frequency voltage with the DC voltage). After that, a radio-frequency voltage having a predetermined frequency and amplitude (or a voltage obtained by combining a radio-frequency voltage with the DC voltage) is applied from the trap voltage generation unit 7 to the ring electrode 21 and the like, and whereby ions included in a mass-to-charge ratio range other than the ions having a target specific mass-to-charge ratio are vibrated and excluded from the ion trap 2. As a result, precursor ions having a specific mass-to-charge ratio are selectively trapped in the ion trap 2. In many cases, this particular mass-to-charge ratio is set to the mass-to-charge ratio of the sample component molecular ion $[M+H]^+$.

Subsequently, the valve 62 of the inert gas supply unit 6 is opened, and an inert gas such as helium gas or the like is introduced into the ion trap 2 to cool the precursor ions. As a result, the precursor ions are converged near to the center of the ion trap 2. Then, the gas containing the radicals generated in the radical generation chamber 51 of the radical generation/irradiation unit 5 is ejected from the nozzle 54. The skimmer 55 located in front of the jet flow removes gas molecules and shapes radicals into a beam having a small diameter to make the radicals pass through a radical introduction port 26 formed in the ring electrode 21. In this way, the radicals are introduced into the ion trap 2, and the precursor ions trapped in the ion trap 2 are irradiated with the radicals.

At this time, the opening degree of the valve 56 and the like are appropriately adjusted so that the flow rate of radicals irradiated on the ions becomes a predetermined flow rate. Further, the irradiation time of the radicals to the precursor ions is also set appropriately. The opening degree of the valve 56 and the irradiation time of radicals can be determined in advance based on the results of preliminary experiments. When the radicals are irradiated, unpaired electron-induced dissociation occurs in the precursor ions to generate product ions. Alternatively, as described later, product ions having different intensities depending on the type of unsaturated bond included in the structure of the hydrocarbon chain are generated. The various product ions generated are trapped in the ion trap 2 and cooled by the inert gas (helium gas or the like) supplied from the inert gas supply unit 61. After that, at a predetermined timing, a high DC voltage is applied from the trap voltage generation unit 7 to the inlet-side end cap electrode 22 and the outlet-side end cap electrode 24, and whereby the acceleration energy is applied to the ions trapped in the ion trap 2 to simultaneously eject the ions from the ion ejection holes 25. The product ions generated here may include both fragment ions, which are fragments of precursor ions, and adduct ions in which atoms or molecules are added to the fragment ions or precursor ions.

Ions having a constant acceleration energy are introduced into the flight space of the time-of-flight mass separation unit 3 and are separated according to the mass-to-charge ratio while flying in the flight space. The ion detector 4 sequentially detects the mass-separated ions, and in response to this detection signal, the spectrum creation unit 13 acquires, for example, time-of-flight spectrum data in which the ejection time point of ion from the ion trap 2 is zero. Then, the flight time is converted into a mass-to-charge ratio using mass calibration information obtained in advance, and a product ion spectrum is created and displayed on the display unit 16. The structure estimation unit 14 estimates the structure of the sample component by performing predetermined data processing based on the information (mass information and intensity) obtained from this product ion spectrum. For example, when performing phospholipid analysis, the structure of the sample component is estimated based on the information of a difference between the mass of the product ion corresponding to a mass peak (the mass peak having an intensity that is significantly distinguishable from noises) appearing in the product ion spectrum created by the spectrum creation unit 13, and the mass of the head group recorded in the compound database 12. A specific measurement example will be described later.

As described above, in the mass spectrometer of this embodiment, while the precursor ions derived from the sample components are introduced into the ion trap 2, radicals are generated from the raw gas by the radio-frequency discharge in the radical generation chamber 51 exhausted at a predetermined pressure by the vacuum pump 57 to irradiate the precursor ions in the ion trap 2. As a result, the precursor ions react with the radicals to generate product ions. The generated product ions are separated and detected by the time-of-flight mass separation unit 3 according to the mass-to-charge ratio.

In the mass spectrometer of this embodiment, radicals are generated in vacuum using the radical generation/irradiation unit 5 provided with the radio-frequency plasma source 53. Therefore, it is not necessary to provide an atmospheric pressure space inside the mass spectrometer. Further, since the radicals are generated by using the plasma generated by using the radio-frequency plasma source 53, the radicals can be generated from various kinds of raw gases such as water vapor, nitrogen gas, and air, which are easy to handle. In particular, by irradiating a precursor ion derived from the sample component having a hydrocarbon chain with a hydroxy radical, an oxygen radical, or a nitrogen radical that can be generated from water vapor, nitrogen gas, or air, the precursor ions are dissociated at a specific position in the hydrocarbon chain to generate product ions useful for estimating the structure of the sample component (particularly, hydrocarbon chain). In this embodiment, the radicals are generated in vacuum, but the radicals may be generated by corona discharge in an atmospheric pressure atmosphere.

Hereinafter, an actual measurement example using the mass spectrometer of this embodiment will be described.

1. Estimation of Unsaturated Bond Position

Figure 3:
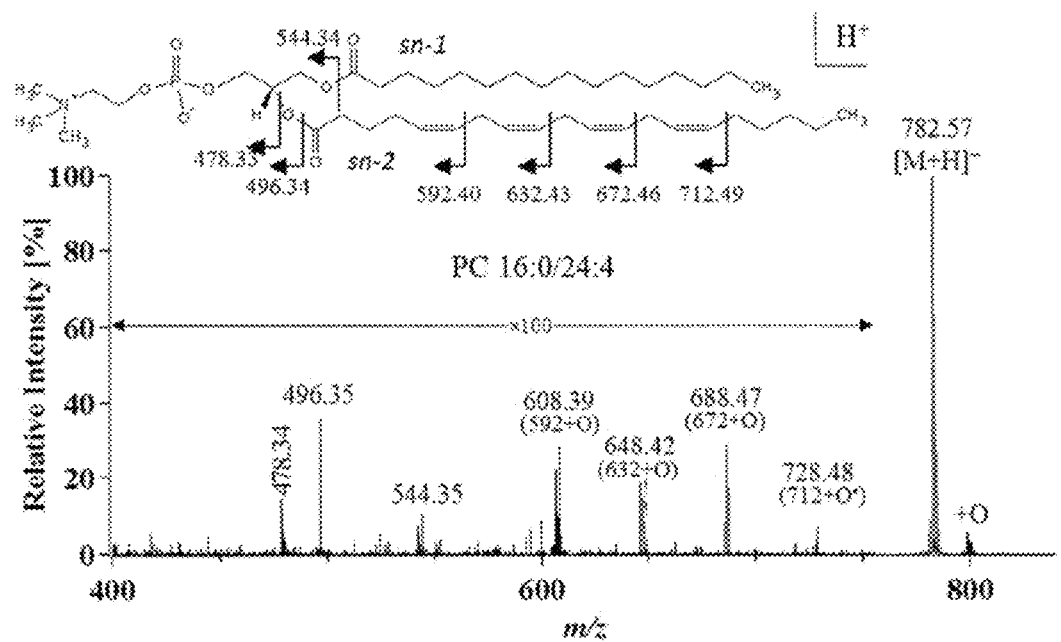
FIG. 3 is a mass spectrum obtained by irradiating and measuring phospholipids with hydroxy radicals and oxygen radicals generated from water vapor by radio-frequency discharge under vacuum in the mass spectrometer of this embodiment.

FIG. 3 illustrates a product ion spectrum obtained by irradiating the precursor ions (phospholipid molecular ions) with radicals which are generated by trapping the phospholipid PC (16:0/20:4) having the structure (illustrated in the upper part of the drawing) in the ion trap 2 and discharging a radio-frequency voltage to water (water vapor) in vacuum.

In this product ion spectrum, the mass peak of the product ion appears in which an oxygen atom is added to a fragment generated by dissociating the precursor ion at the position of the unsaturated bond included in the hydrocarbon chain. Since the raw gas is water vapor and the mass peaks corresponding to the ions in which oxygen is added to the precursor ions and fragments appear, it can be seen that the hydrocarbon chain is selectively dissociated at the position of the unsaturated bond by hydroxy radicals and oxygen radicals generated by the radio-frequency discharge of water vapor. When the product ion spectrum is acquired by irradiating the precursor ions derived from the sample component including the hydrocarbon chain with the hydroxy radical or the oxygen radical, the structure such as the position of the unsaturated bond of the hydrocarbon chain and the length of the hydrocarbon chain included in the sample component can be estimated based on the mass corresponding to the position of the mass peak and the information recorded in the compound database 12. The structure estimation unit 14 performs the above estimation and displays the result on the display unit 15. In this measurement example, the product ion to which an oxygen atom is added is generated, and it is considered that the unsaturated bond is selectively cleaved because the radical having an oxidizing ability is attached to the position of the unsaturated bond. Therefore, it is considered that the hydrocarbon chain can be selectively dissociated at the position of the unsaturated bond also by using a radical of a type other than these, which has the same oxidizing ability as the hydroxy radical and the oxygen radical.

Further, among the peaks of the product ion spectrum illustrated in FIG. 3, it can be seen that the intensity of the desorption peak of the carbon chain bonded to the sn-2 position (478 Da, 496 Da) is stronger than the strength of the desorption peak of the carbon chain bonded to the sn-1 position (544 Da). In particular, it can be seen that the desorption peak of the desorption peak at the sn-1 position (528 Da (=544 Da−16 Da)) corresponding to the desorption peak at the sn-2 position (478 Da) does not appear on the product ions. By using such characteristics, it is possible to estimate at which position in a known structure (or structure candidate) such as a head group the hydrocarbon chain is bound in a phospholipid or the like. For example, by including in the compound database 12 information indicating the relationship between the bonding position of the hydrocarbon chain and the relative intensity of the mass peak appearing in the product ion spectrum, the structure estimation unit 14 can estimate the structure of the hydrocarbon chain based on the mass spectrum and also estimate the overall structure of the sample component by specifying the bonding position of the hydrocarbon chain.

As described above, the selective cleavage at the position of the unsaturated bond is caused by the attachment of the radical having an oxidizing ability to one of the two carbons having the unsaturated bond. In many cases, as in the product ion spectrum illustrated in FIG. 3, many fragments to which oxygen atoms are attached are detected as product ions after cleavage of the unsaturated bond. However, in many cases, many fragments to which oxygen atoms are not attached are detected as product ions depending on the measurement conditions. When two types of product ions are detected by the dissociation of the same unsaturated bond, it becomes difficult to analyze the mass peak appearing in the product ion spectrum. In addition, depending on the structure of the hydrocarbon chain, the mass-to-charge ratio of the product ion, which is a fragment with attached oxygen atoms, and the mass-to-charge ratio of the product ion, which is a fragment with another structure and without attached oxygen atoms, may be almost the same. In a high-resolution mass spectrometer such as the time-of-flight mass separation unit of this embodiment, the ions can be separated at the level of the mass-to-charge ratio below the decimal point, but they cannot be separated from each other by a general-purpose mass spectrometer in some cases.

When the measurement is performed using a general mass spectrometer, it is preferable to generate a hydroxy radical or an oxygen radical from the raw gas containing a stable isotope ($^{18}O$) of oxygen atom that is a mass number of 18. As a result, for product ions that are fragments with attached oxygen atoms, two mass peaks appear which differ in mass by 2 Da, so it is possible to easily determine whether the detected product ions are fragments with attached oxygen atoms.

2. Estimation of Unsaturated Bond Type

In the above example, the position of the unsaturated bond has been specified by focusing on the product ion generated by the cleavage of the unsaturated bond. However, not all unsaturated bonds of the precursor ion are cleaved. In some cases, even if radicals are attached at the position of the unsaturated bond, cleavage does not occur. In that case, an oxygen atom is bonded to both of the two carbon atoms having the unsaturated bond, and a product ion in which the bond between the two carbon atoms is changed to a saturated bond is generated. That is, an adduct ion in which oxygen atoms are attached to the precursor ion (precursor adduct ion) is generated as a product ion.

Figure 4:
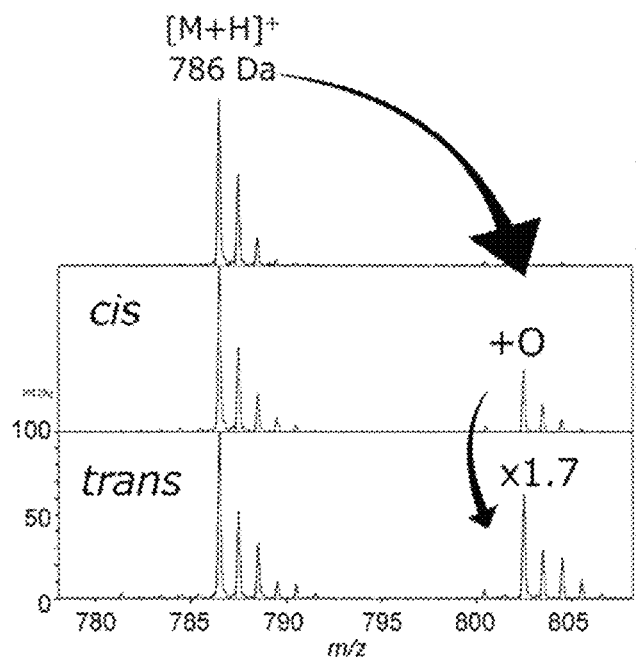
FIG. 4 is a partially enlarged view of a mass spectrum acquired by measuring product ions which are generated in the mass spectrometer of this embodiment by irradiating oxygen radicals, which are generated from oxygen gas by radio-frequency discharge under vacuum, to each of a precursor ion derived from a phospholipid having a cis unsaturated bond and a precursor ion derived from a phospholipid having a trans unsaturated bond.
Figure 5:
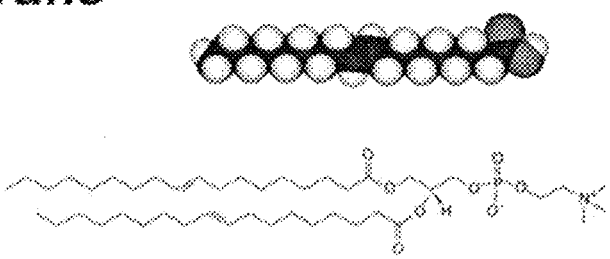
FIG. 5 is a diagram illustrating molecular structures of a phospholipid in which the unsaturated bond is a trans type and a phospholipid in which the unsaturated bond is a cis type.
Figure 5:
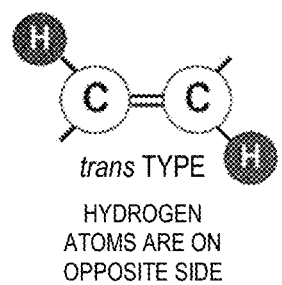
Figure 5:
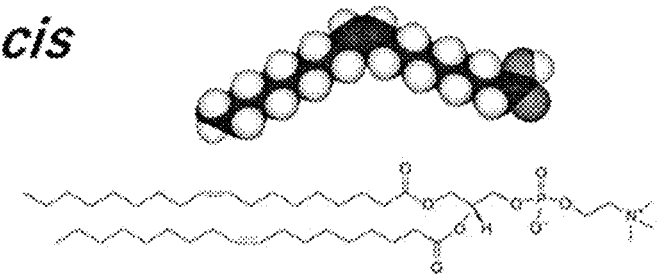
Figure 5:
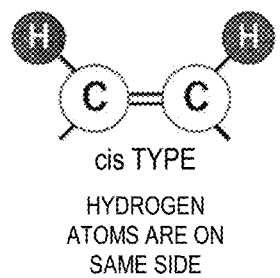

FIG. 4 is an enlarged view of the vicinity of the mass-to-charge ratio of the precursor ion in the product ion spectrum obtained by irradiating two fatty acids, PC(18:1 trans) and PC(18:1 cis), with oxygen radicals for 1 second. The upper part of FIG. 5 illustrates the molecular structure of PC(18:1 trans), and the lower part of FIG. 5 illustrates the molecular structure of PC(18:1 cis). PC(18:1 trans) and PC(18:1 cis) differ only in whether the position of the unsaturated bond is a trans or cis type, and the other structures are the same.

From the results illustrated in FIG. 4, it can be seen that the strength of the precursor adduct ion generated from a fatty acid having a trans unsaturated bond is higher than the strength of a precursor adduct ion generated from a fatty acid having a cis unsaturated bond. For these, the ratio of the intensity of the precursor adduct ion to the intensity of the precursor ion has been determined, and the ratio of the former fatty acid is about 1.7 times the ratio of the latter fatty acid.

Figure 6:
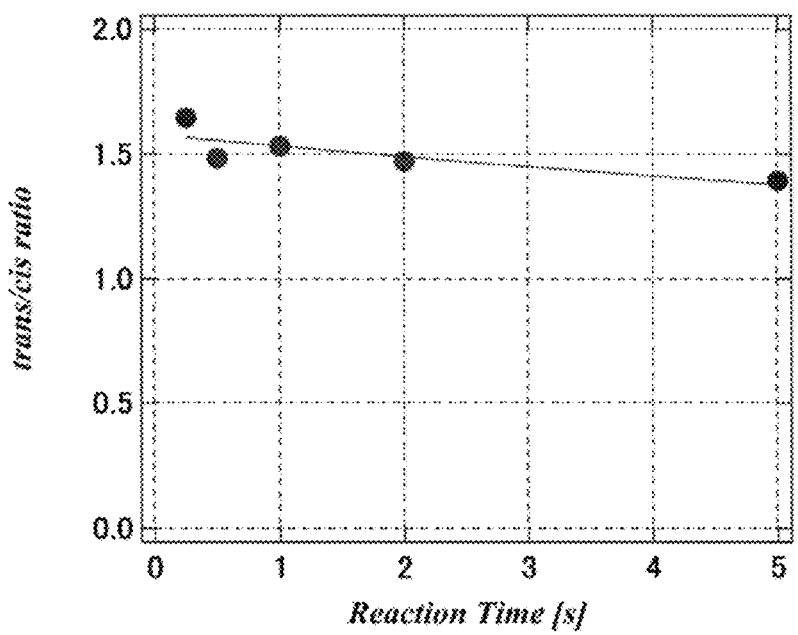
FIG. 6 is a graph illustrating a relationship between a reaction time and a ratio of a ratio of the detection intensity of precursor adduct ions generated from phospholipid having trans unsaturated bond to that of precursor ions and a ratio of the detection intensity of precursor adduct ions generated from phospholipid having cis unsaturated bond to that of precursor ions.

In a trans unsaturated bond, the hydrogen atoms bonded to two carbon atoms having the unsaturated bond are located on the opposite side of the unsaturated bond. That is, the oxygen radical can access the unsaturated bond from two directions in which the hydrogen atoms are located. On the other hand, in a cis unsaturated bond, the hydrogen atoms bonded to two carbon atoms having the unsaturated bond are located on the same side of the unsaturated bond. Therefore, the oxygen radical can access the unsaturated bond only from one direction. Therefore, it is considered that the reaction rate of the oxygen radical attached to the trans unsaturated bond is faster than the reaction rate of the oxygen radical attached to the cis unsaturated bond. The results illustrated in FIG. 4 are considered to reflect this difference in reaction rate. When the same measurement has been performed as illustrated in FIG. 6 while changing the reaction time with oxygen radicals, it has been confirmed that the ratio of the ratio (intensity ratio) of the detection intensity of precursor adduct ions generated from phospholipid having the trans unsaturated bond to the detection intensity of the precursor ions and the ratio (intensity ratio) of the detection intensity of the precursor adduct ions generated from phospholipid having the cis unsaturated bond to the detection intensity of the precursor ions becomes small as the reaction time became longer.

As described above, the trans unsaturated fatty acid and the cis unsaturated fatty acid can be distinguished from each other by utilizing the fact that the ratio of the intensity of the precursor adduct ion to the intensity of the precursor ion is different. For example, for the unsaturated fatty acids which is unclear in its type, a trans or cis type, the intensity ratio obtained by measurement using a standard sample is stored in a database in advance, and the ratio obtained from the measurement of the unsaturated fatty acid in which the type of unsaturated bond is unknown is compared to the ratio stored in the database, so that the type of the unsaturated bond can be estimated.

Figure 7:
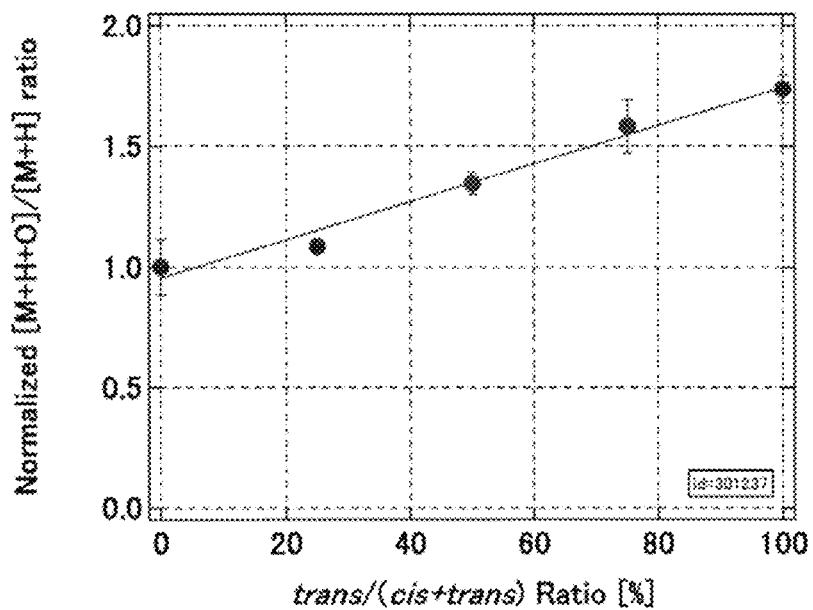
FIG. 7 is a graph illustrating a relationship between the ratio of the detection intensity of precursor adduct ions to that of precursor ions and a mixing ratio of trans unsaturated fatty acid and cis unsaturated fatty acid.

In FIG. 7, for a plurality of samples in which the cis unsaturated fatty acid is mixed with the trans unsaturated fatty acid in different ratios, in the same manner as above, the measurement of irradiating oxygen radicals for one second has been performed, and the result of having calculated the intensity ratio of the precursor adduct ions and the precursor ions is illustrated. From this result, it is confirmed that the intensity ratio increased linearly as the proportion of trans fatty acid increased. Therefore, by including information on the strength ratio of cis unsaturated fatty acids and the strength ratio of trans unsaturated fatty acids in the compound database 12, the ratio of the cis unsaturated fatty acid and the trans unsaturated fatty acid contained in the unknown sample can be estimated from the intensity ratio obtained from the measurement of the unknown sample where both the trans unsaturated fatty acids and cis unsaturated fatty acids may be contained. The information recorded in the compound database 12 may be based on data obtained by measuring a standard sample or the like, or may be based on data obtained from computer simulation.

It is known that some trans unsaturated fatty acids adversely affect the human body, and it is important to identify whether a food sample contains trans unsaturated fatty acids. However, even if two types of components that have the same structure except that the types of unsaturated fatty acids are different are separated by a liquid chromatograph or gas chromatograph column, the elution times from both columns are very close (retention times are almost the same). Therefore, it is very difficult to separate the peak of trans unsaturated fatty acid and the peak of cis unsaturated fatty acid from the chromatogram obtained by chromatography. Utilizing the fact that the intensity ratio of the precursor adduct ions and the precursor ions is different between the cis unsaturated fatty acid and the trans unsaturated fatty acid as described above, it becomes possible to determine which of the cis unsaturated fatty acid and the trans unsaturated fatty acid is contained in an unknown sample or to determine a mixture of both acids.

Such a determination can be made more accurately by using a chromatograph mass spectrometric analysis which is a combination of a chromatograph and a mass spectrometer. For example, as the ion source 1 in FIG. 1, a chromatograph mass spectrometer can be preferably used which uses an electron ionization (EI) source or an electrospray ionization (ESI) source and is configured to ionize an eluate from a column of a gas chromatograph or a liquid chromatograph. Then, components of an unknown sample, in which it is unclear whether only one of the cis unsaturated fatty acid and the trans unsaturated fatty acid is contained, or whether both of them are contained, are separated by the chromatographic column, and as described above trapped in the ion trap 2 as the precursor ions, and are subsequently irradiated with radicals having oxidizing ability. After that, the ions are ejected from the ion trap 2 and are mass-separated and detected. This series of measurements is repeated and executed during the time (retention time) during which unsaturated fatty acids of unknown cis type or trans type are being eluted from the chromatographic column. Three-dimensional data is obtained by plotting the intensity of the product ions in a graph with time (retention time) on one axis and mass-to-charge ratio on another axis.

From the three-dimensional data thus obtained, the intensity ratio of the precursor adduct ion and the precursor ion and its change with time are obtained. Although the retention times of the trans unsaturated fatty acids and the cis unsaturated fatty acids are very close, they are not exactly the same. If the unknown sample contains both the trans unsaturated fatty acids and the cis unsaturated fatty acids, for example, only the trans unsaturated fatty acids will elute during the first retention period, and gradually the cis unsaturated fatty acids also elutes at the same time. Finally, only the cis unsaturated fatty acids elutes. Therefore, when the intensity ratio obtained from the above three-dimensional data gradually decreases with time, the eluate from the chromatographic column changes with time as described above. It is possible to estimate that the unknown sample contains both the trans unsaturated fatty acids and the cis unsaturated fatty acids. When the intensity ratio of the precursor adduct ion and the precursor ion does not change with time, it can be determined that only one of the trans unsaturated fatty acid and the cis unsaturated fatty acid is contained. Further, by comparing the intensity ratio with the intensity ratio stored in advance in the database, it can be estimated whether it is a trans unsaturated fatty acid or a cis unsaturated fatty acid.

As described above, the rate of reaction in which radicals are attached to unsaturated bonds depends on the temperature of radicals and the amount of radicals. Therefore, if the measurement conditions when determining the intensity ratio of precursor adduct ions and precursor ions of various components registered in the database and the conditions when measuring an unknown sample are different, the intensity ratio between the precursor adduct ions and the precursor ions may differ from the intensity ratio recorded in the database even if the same components as those recorded in the database are measured.

Therefore, it is preferable to perform the measurement using one or a plurality of standard samples before the measurement of the actual sample. When it is possible to use a standard sample containing the same components as those contained in the actual sample, it is preferable to compare the measurement result of the standard sample with the measurement result of the actual sample so as to estimate whether the unsaturated fatty acid contained in the actual sample is a trans or cis type. If it is difficult to use a standard sample containing the same components as those contained in the actual sample, a standard sample containing any of the components recorded in the database is used. Then, the intensity ratio obtained from the measurement of the standard sample is compared with the intensity ratio recorded in the database, and the value of the intensity ratio recorded in the database is corrected. This makes it possible to prevent the components contained in the actual sample from being erroneously estimated due to the difference in radical irradiation conditions. The standard sample may be measured by an external standard method, which is measured separately from the actual sample, or by an internal standard method, which is simultaneously measured with the actual sample. It should be noted that, when measuring by the internal standard method, it is necessary to use a standard sample that does not generate ions with the same mass-to-charge ratio as the ions that can be generated from the actual sample (at least the precursor ion and the precursor adduct ion).

The above method for estimating trans unsaturated fatty acid and cis unsaturated fatty acid using the intensity ratio of precursor adduct ion and precursor ion presupposes that a target intensity ratio to be compared with the intensity ratio obtained by measuring the actual sample, that is, the structure other than the type of the unsaturated bond is known in advance. The chemical formula of the hydrocarbon chain may be determined by measurement of irradiation with a radical having a reducing ability as described later, or may be determined by another method. Further, the number and position of unsaturated bonds may be determined from the above measurement in which a radical having an oxidizing ability is irradiated, or may be determined by another method.

3. Estimation of the Overall Structure of the Hydrocarbon Chain

Figure 8:
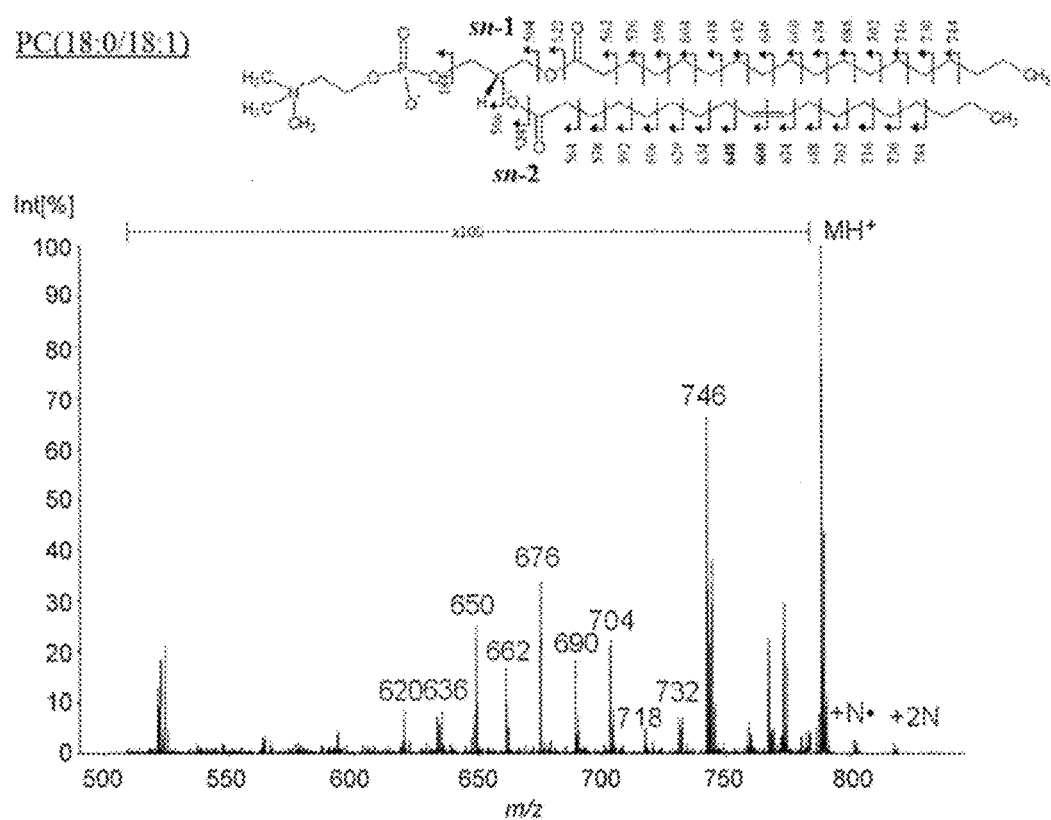
FIG. 8 is a mass spectrum obtained by irradiating and measuring phospholipids with nitrogen radicals generated from nitrogen gas by radio-frequency discharge under vacuum in the mass spectrometer of this embodiment.

FIG. 8 illustrates a product ion spectrum obtained by trapping the phospholipid PC (18:0/18:1) having the structure (illustrated in the upper part of the drawing) in the ion trap 2 and irradiating radicals generated by radio-frequency discharge of nitrogen gas under vacuum. In this product ion spectrum, mass peaks of a series of fragment ions dissociated at the positions of carbon-carbon bonds included in the hydrocarbon chain appear. That is, regarding the fragment ions which are dissociated and generated at the unsaturated bond position, the mass peaks corresponding to C and separated by 12 Da (650 Da mass peak and 662 Da mass peak) appear. Regarding the fragment ions which are dissociated and generated at the saturated bond position, the mass peaks corresponding to $CH_2$ and separated by 14 Da (the mass peak other than the above peaks) appear. That is, when a precursor ion derived from a sample component including a hydrocarbon chain is irradiated with a nitrogen radical to acquire a product ion spectrum, the structure estimation unit 14 can sequentially estimate the structure (the estimation of the unsaturated bond position and the length of the hydrocarbon chain) of the hydrocarbon chain from the information.

The mass described in the molecular structure illustrated in the upper part of FIG. 8 is measured by the present inventor separately by irradiating precursor ions derived from this sample component (phospholipid PC(18:0/18:1)) with hydrogen radicals, and obtained from the mass peak of the product ion spectrum. The product ion spectrum illustrated in the lower part of FIG. 8 is acquired by irradiating precursor ions derived from sample component with nitrogen radicals as described above. The mass (mass-to-charge ratio) of the mass peak appearing in the product ion spectrum is 1 to 2 Da larger than the mass (mass-to-charge ratio) of the mass peak of the product ions obtained by irradiation with hydrogen radicals. That is, the mass peak appearing in this product ion spectrum generated by the dissociation of the carbon-carbon bond of the hydrocarbon chain is shifted by +2 Da from the mass peak of the product ion spectrum obtained by irradiation with hydrogen radicals. Therefore, using this characteristic, it is confirmed that the mass peak mass (mass-to-charge ratio) changes by 2 Da by acquiring the product ion spectrum by nitrogen radical irradiation and hydrogen radical irradiation and comparing them with each other. Thus, it can be confirmed that the mass peak originates from the product ion generated by dissociation in the hydrocarbon chain.

Since the raw gas is nitrogen gas and the mass peak corresponding to the ion in which nitrogen is added to the precursor ion appears, the hydrocarbon chain can be selectively dissociated at the position of the carbon-carbon bond by the nitrogen radical generated by the radio-frequency discharge of nitrogen gas regardless of whether it is an unsaturated bond or a saturated bond. Further, since it is considered that such selective dissociation depends on the reducing ability of the nitrogen radicals, it is estimated that the hydrocarbon chain can be selectively dissociated at the position of the carbon-carbon bond also by using the radicals (ammonia radicals and the like) having the reducing ability similarly to the nitrogen gas regardless of whether it is an unsaturated bond or a saturated bond as described above.

As described above, the product ion, which is dissociated and generated at the position of the carbon-carbon bond, is detected as described above also by irradiating the precursor ion derived from the sample component having the hydrocarbon chain with the hydrogen radical, so that the product ion spectrum can be obtained. However, when hydrogen radicals are used, not only the dissociation of the precursor ions by the abstraction of hydrogen atoms from the hydrocarbon chain, but also the reaction that hydrogen radicals are attached to the hydrocarbon chain from which the hydrogen atoms are abstracted occur almost at the same time. Therefore, the hydrogen radicals are attached to the product ions generated by the abstraction of hydrogen atoms, so that product ions having various mass values are generated, and as a result, it becomes difficult to analyze the spectrum.

Figure 9:
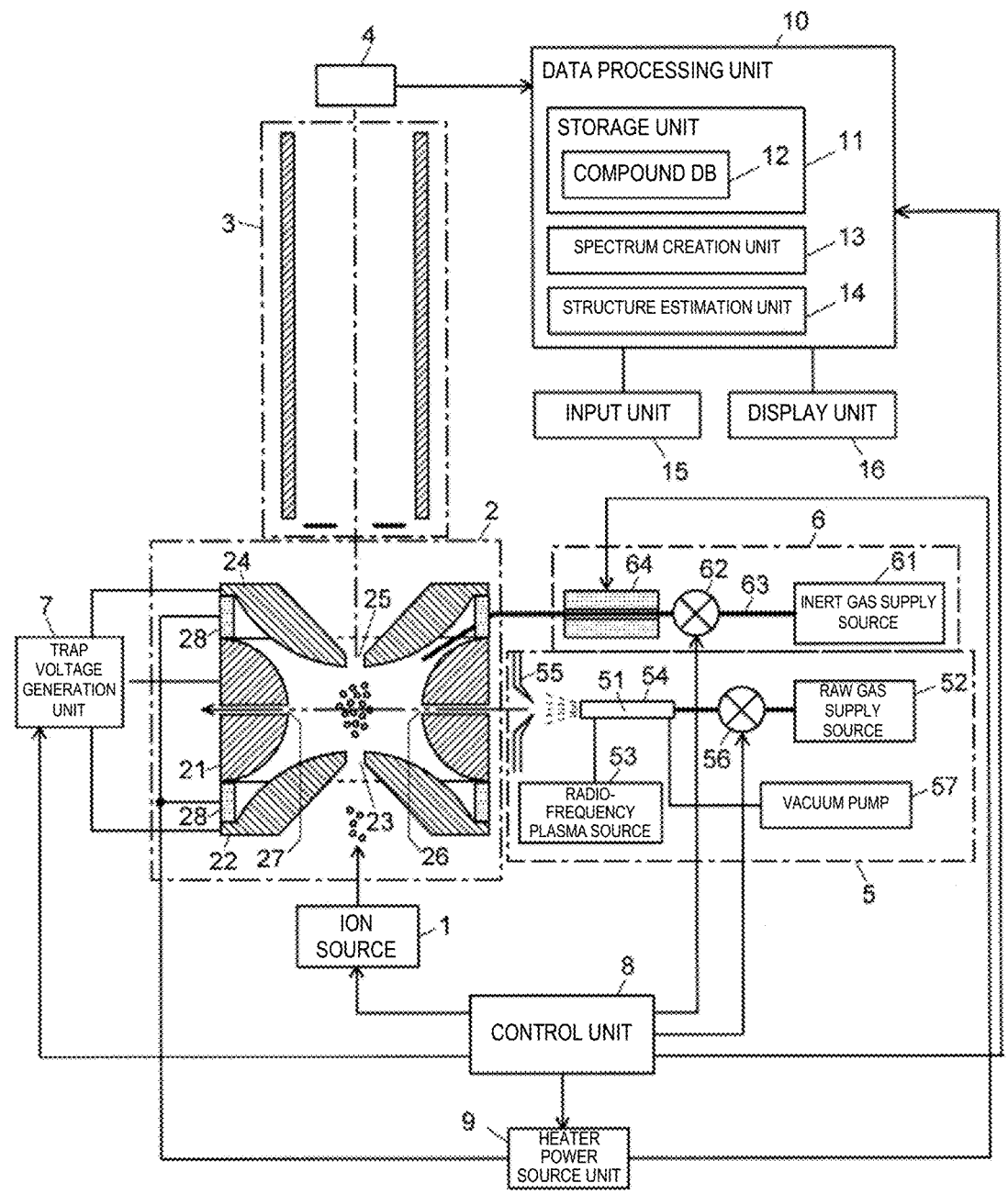
FIG. 9 is a schematic configuration diagram of an ion trap-time-of-flight mass spectrometer of a modification.

Next, a modification having a configuration for further increasing the reaction efficiency of the precursor ions in the mass spectrometer of the above embodiment will be described with reference to a schematic configuration diagram illustrated in FIG. 9. The same components as those in FIG. 1 are designated by the same reference numerals and the description thereof will be omitted.

In the mass spectrometer of the above embodiment, the ions trapped in the ion trap 2 are irradiated with radicals generated from the raw gas by vacuum electrical discharge to dissociate the ions and generate the product ions. As a result, the product ions derived from sample components can be generated and analyzed. However, depending on the type of raw gas, the reactivity of radicals is low and the production efficiency of the product ions may not always be high. Therefore, the mass spectrometer of the modification is provided with a configuration for increasing the ion dissociation efficiency and increasing the ion dissociation sequence coverage, that is, reducing the binding site specificity.

In this mass spectrometer, an insulator for maintaining the relative positions of the electrodes 21, 22, and 24 while maintaining the electrical insulation between the ring electrode 21 and the end cap electrodes 22 and 24 of the ion trap 2 (alumina ceramic) is replaced with a ceramic heater 28. The ceramic heater 28 is connected to the heater power source unit 9, and when a heater power source unit 9 supplies power to the ceramic heater 28 under the control of the control unit 8, the ceramic heater 28 generates heat. Then, the electrodes 21, 22, and 24 are also heated by heat conduction from the ceramic heater 28. A thermocouple (not illustrated) is embedded in the ceramic heater 28. The supplied power is adjusted based on the monitored temperature of the ceramic heater 28 by the thermocouple, and the amount of heat generated by the ceramic heater 28 is feedback-controlled. As a result, the ceramic heater 28 is accurately adjusted to a target temperature.

While the electrodes 21, 22, and 24 of the ion trap 2 are being heated by the ceramic heater 28, a helium gas (or another inert gas) that is a buffer gas is intermittently introduced into the ion trap 2 from the inert gas supply unit 6 from the time when radicals are introduced into the ion trap 2 to the time when product ions are discharged from the ion trap 2 as described above. Then, the heat of each electrode 21, 22, and 24 of the ion trap 2 propagates to the precursor ions via the buffer gas. The heat activates the ions, that is, the energy is applied by the heat, and the dissociation efficiency of the precursor ions is improved. In addition, a bond that is difficult to be broken (that is, a binding site having a high binding energy) in a state where heat is not applied is easily dissociated, so that more kinds of product ions are generated and the sequence coverage is improved.

Further, a gas introduction pipe heater 64 is also provided around the gas introduction pipe 63 that supplies gas into the ion trap 2 from the gas supply source 61 of the inert gas supply unit 6. Electric power is supplied from the heater power source unit 9 to the gas introduction pipe heater 64 to preheat the gas introduction pipe 63, and a helium gas (or another inert gas) as a buffer gas is introduced into the ion trap 2 from the inert gas supply unit 6 at the same timing as the buffer gas is introduced into the ion trap 2 in the above embodiment. At this time, the helium gas is heated by the gas introduction pipe 63 near the heater 64 and is introduced into the ion trap 2 at a high temperature. When this high-temperature helium gas collides with the precursor ions, the heat of the helium gas is propagated to the ions and the dissociation of ions due to the irradiation of radicals is promoted. Further, it is not always necessary to perform both heating of the electrodes 21, 22, and 24 by the ceramic heater 28 and heating of the buffer gas by the gas introduction pipe heater 64, and it is possible to configure so that only one is performed. In this modification, the gas introduction pipe 63 is heated, but the same effect as above can be obtained by heating the raw gas supply source 52 itself. Of course, both of them may be heated.

The above-described embodiment and modification are merely examples, and can be appropriately modified in accordance with the spirit of the invention. For example, in the above embodiment and modification, the ion trap time-of-flight mass spectrometer equipped with a three-dimensional ion trap has been used, but a linear ion trap or collision cell may be used instead of the three-dimensional ion trap, and the radicals may be irradiated at the timing of introducing the precursor ions to them. Although the time-of-flight mass separation unit is a linear type in the above-mentioned embodiment and modification, a time-of-flight mass separation unit such as a reflectron type or a multi-turn type may be used. Alternatively, in addition to the time-of-flight mass separation unit, other forms of mass separation unit such as a mass separation unit that uses an ion separation function of the ion trap 2 itself or an orbitrap can be used. Further, the ion trap may be configured to be applied with a rectangular-wave radio-frequency voltage instead of a general sinusoidal radio-frequency voltage. When a rectangular-wave radio-frequency voltage is used, the potential energy in the ion trap for confining the precursor ions changes binarily with time, and this can be used to increase the efficiency of the radical reaction of the precursor ions. In addition, although the radio-frequency plasma source is used as the vacuum discharge unit in the above-described embodiment and modification, a hollow cathode plasma source or a magnetic field confinement type plasma source may be used instead. Alternatively, a configuration in which radicals are generated by corona discharge can be adopted.

In the above measurement example, oxygen radicals and hydroxyl radicals have been generated using water vapor as the raw gas, and nitrogen radicals have been generated using nitrogen gas to dissociate the precursor ions, but the usable raw gas and radical species are not limited to these. For example, radicals can be generated from chlorides, sulfur compounds, fluorides, hydroxides, oxides, carbides, and nitrides represented by hydrochloric acid, sodium chloride, sulfuric acid, sodium sulfide, hydrofluoric acid, sodium fluoride, sodium hydrogen carbonate, sodium hydroxide, hydrogen peroxide, carbon dioxide, carbohydrates, hydrocarbons, and ammonium, and can be used for an appropriate dissociation reaction in consideration of their oxidizing ability and reducing ability. When these gases are used, there is a high possibility that reactive particles will attach to the inside of the ion trap that causes the dissociation reaction and contamination will occur. Therefore, it is preferable to employ a configuration including a heating unit that heats the ion trap by the heater like the mass spectrometer of the modification of FIG. 9 to remove (degas) the gas. Further, when a raw gas derived from a compound having a low vapor pressure is used, it is preferable to increase the vapor pressure by adopting a configuration in which a heating unit is provided in the raw gas supply source and/or the flow path from the raw gas supply source 52 to the nozzle 54.

In all of the above measurement examples, the product ion spectrum has been acquired. When determining only whether the unsaturated fatty acid is a cis type or trans type, it is not always necessary to perform scan measurement, and only the mass-to-charge ratio of the precursor ions and the ions of the mass-to-charge ratio of the precursor adduct ions may be detected.

In the above measurement examples, the results of measuring phospholipids have been explained. The mass spectrometry method and device according to the invention may be used not only for sample components in which a substance having a known structure or structure candidate is bound to a hydrocarbon chain, but also for sample components in which the structure of the substance bound to the hydrocarbon chain is unknown. In either case, at least the structure of the hydrocarbon chain can be estimated. Regarding such sample components, for example, the structure other than the hydrocarbon chain may be estimated by the structure analysis of the product ion generated by dissociating the precursor ion by the LE-CID method, and the entire structure of the sample component may be estimated also using the structure of hydrocarbon chain estimated by the mass spectrometry technique of the invention.

The mass spectrometry method and device according to the invention may be used to estimate the structure of sample components having hydrocarbon chains of various structures such as the hydrocarbon chain whose side chain is modified with a hydroxyl group, a carboxyl group, a methyl group, or the like, or the hydrocarbon chain including a cyclic portion in addition to a straight chain or a branched chain. For example, for neutral lipids such as triacylglycerol and fatty acids, the mass spectrometry method and device described in the above embodiment can be used. Further, the length of the hydrocarbon chain is not particularly limited as long as it is a length that allows mass spectrometry, and for example, the structure of a sample component having a hydrocarbon chain containing 200 or 300 carbon atoms can be estimated.

REFERENCE SIGNS LIST

1 . . . Ion source
2 . . . Ion trap
21 . . . Ring electrode
22 . . . Inlet-side end cap electrode
23 . . . Ion introduction hole
24 . . . Outlet-side end cap electrode
25 . . . Ion ejection hole
26 . . . Radical introduction port
27 . . . Radical discharge port
28 . . . Ceramic heater
3 . . . Time-of-flight mass separation unit
4 . . . Ion detector
5 . . . Radical generation/irradiation unit
51 . . . Radical generation chamber
52 . . . Raw gas supply source
53 . . . Radio-frequency plasma source
531 . . . Microwave source
532 . . . Three stub tuner
54 . . . Nozzle
541 . . . Ground electrode
542 . . . Torch
543 . . . Needle electrode
544 . . . Connector
55 . . . Skimmer
56 . . . Valve
57 . . . Vacuum pump
6 . . . Inert gas supply unit
61 . . . Inert gas supply unit
62 . . . Valve
63 . . . Gas inlet pipe
64 . . . Gas inlet pipe heater
7 . . . Trap voltage generation unit
8 . . . Control unit
9 . . . Heater power supply
10 . . . Data processing unit
11 . . . Storage unit
12 . . . Compound database
13 . . . Spectrum generation unit
14 . . . Structure estimation unit
15 . . . Input unit
16 . . . Display unit

The invention claimed is:

1. A mass spectrometer for generating a product ion from a precursor ion derived from a sample component having a hydrocarbon chain and mass-analyzing the product ion, comprising:
   a reaction chamber into which the precursor ion is introduced;
   a radical generator that generates a radical having an oxidizing ability other than a hydrogen radical, where the hydrogen radical is defined as a radical represented by H*;
   a radical irradiator that irradiates an inside of the reaction chamber with the radical generated by the radical generator;
   a separation detector that separates product ions generated from the precursor ion by a reaction with the radical according to a mass-to-charge ratio and detects a product ion; and
   a structure estimator that estimates a structure of the hydrocarbon chain based on a mass-to-charge ratio and an intensity of the detected product ion,
   wherein the structure estimator searches a product ion generated by dissociating the precursor ion at a position of an unsaturated bond included in the hydrocarbon chain so as to estimate the position of the unsaturated bond.

2. The mass spectrometer according to claim 1, wherein the radical generator generates at least one of a hydroxy radical and an oxygen radical.

3. The mass spectrometer according to claim 1, wherein the radical generator generates a radical from a gas containing at least one kind of water vapor, nitrogen gas, and air.

4. The mass spectrometer according to claim 1, wherein the radical generator further includes a radical generation chamber, a vacuum exhauster for exhausting the radical generation chamber, a gas supply source for introducing a gas into the radical generating chamber, and a vacuum discharger for generating a vacuum electrical discharge in the radical generation chamber.

5. The mass spectrometer according to claim 4,
wherein the vacuum discharger is a radio-frequency plasma source, a hollow cathode plasma source, or a magnetic field confinement type plasma source.

6. The mass spectrometer according to claim 1, further comprising:
a heater for applying heat to a precursor ion introduced into the reaction chamber.

7. The mass spectrometer according to claim 4, further comprising:
a heater for heating the gas, which is provided in at least one of the gas supply source, the reaction chamber, and a flow path from the gas supply source to the reaction chamber.

8. A mass spectrometer for generating a product ion from a precursor ion derived from a sample component having a hydrocarbon chain and mass-analyzing the product ion, comprising:
a reaction chamber into which the precursor ion is introduced;
a radical generator that generates a radical having a reducing ability;
a radical irradiator that irradiates an inside of the reaction chamber with the radical generated by the radical generator;
a separation detector that separates product ions generated from the precursor ion by a reaction with the radical according to a mass-to-charge ratio and detects a product ion; and
a structure estimator that estimates a structure of the hydrocarbon chain based on a mass-to-charge ratio and an intensity of the detected product ion,
wherein the structure estimator searches for a product ion generated by dissociating the precursor ion at a position of a carbon-carbon bond included in the hydrocarbon chain so as to estimate a bonding position of the hydrocarbon chain in the sample component.

9. The mass spectrometer according to claim 8,
wherein the structure estimator estimates a structure of the hydrocarbon chain by extracting a set of product ions having a mass difference of 12 Da or 14 Da.

10. A mass spectrometer for generating a product ion from a precursor ion derived from a sample component having a hydrocarbon chain and mass-analyzing the product ion, comprising:
a reacting chamber into which the precursor ion is introduced;
a radical generator that generates a radical having an oxidizing ability other than a hydrogen radical or/and a radical having a reducing ability, where the hydrogen radical is defined as a radical represented by H*;
a radical irradiator that irradiates an inside of the reaction chamber with the radical generated by the radical generator;
a separation detector that separates product ions generated from the precursor ion by a reaction with the radical according to a mass-to-charge ratio and detects a product ion; and a structure estimator that estimates a structure of the hydrocarbon chain based on a mass-to-charge ratio and an intensity of the detected product ion,
wherein the sample component is one in which a substance having a known structure or structure candidate is bound to a hydrocarbon chain,
the mass spectrometer further comprising:
a compound database in which information on the structure or structure candidate is recorded,
wherein the structure estimator estimates a structure of the sample component based on a mass-to-charge ratio of the detected product ion and information on the structure or structure candidate recorded in the compound database.

11. A mass spectrometer for generating a product ion from a precursor ion derived from a sample component having a hydrocarbon chain and mass-analyzing the product ion, comprising:
a reacting chamber into which the precursor ion is introduced;
a radical generator that generates a radical having an oxidizing ability other than a hydrogen radical or/and a radical having a reducing ability, where the hydrogen radical is defined as a radical represented by H*;
a radical irradiator that irradiates an inside of the reaction chamber with the radical generated by the radical generator;
a separation detector that separates product ions generated from the precursor ion by a reaction with the radical according to a mass-to-charge ratio and detects a product ion; and
a structure estimator that estimates a structure of the hydrocarbon chain based on a mass-to-charge ratio and an intensity of the detected product ion,
wherein the structure estimator estimates a type of an unsaturated bond included in the hydrocarbon chain of the sample component based on a ratio of an intensity of a product ion, which is an adduct ion in which oxygen is attached to the precursor ion, to an intensity of the precursor ion.

12. The mass spectrometer according to claim 11, further comprising:
a compound database that collects information on the ratios of a plurality of components that are candidates for the hydrocarbon chain contained in the sample component,
wherein the structure estimator estimates a type of an unsaturated bond contained in the hydrocarbon chain of the sample component by comparing the ratio obtained by the measurement of the sample component with the ratio recorded in the compound database.

13. The mass spectrometer according to claim 12,
wherein the compound database stores information on the ratios for both cis and trans components that are common except for the type of unsaturated bond, and
wherein the structure estimator compares the ratio obtained by the measurement of the sample component with the ratio recorded in the database to estimate a proportion of a component having a cis unsaturated bond and a component having a trans unsaturated bond which are contained in the sample component.

* * * * *